(12) United States Patent
Al-Shuhail et al.

(10) Patent No.: US 11,795,813 B2
(45) Date of Patent: Oct. 24, 2023

(54) MODIFIED SONIC TOOL FOR ADVANCED FORMATION EVALUATION

(71) Applicant: KING FAHD UNIVERSITY OF PETROLEUM AND MINERALS, Dhahran (SA)

(72) Inventors: Abdullatif Al-Shuhail, Dhahran (SA); Mohamed Mahmoud, Dhahran (SA); Rakan Fadhel, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/692,419

(22) Filed: Mar. 11, 2022

(65) Prior Publication Data

US 2023/0287786 A1  Sep. 14, 2023

(51) Int. Cl.
*E21B 47/107* (2012.01)
*E21B 49/00* (2006.01)
*E21B 47/085* (2012.01)

(52) U.S. Cl.
CPC .......... *E21B 47/107* (2020.05); *E21B 47/085* (2020.05); *E21B 49/005* (2013.01)

(58) Field of Classification Search
CPC ..... E21B 47/107; E21B 47/085; E21B 49/005
See application file for complete search history.

(56) References Cited

U.S. PATENT DOCUMENTS

| 2017/0199295 A1* | 7/2017 | Mandal | E21B 33/14 |
| 2018/0031732 A1 | 2/2018 | Mosse et al. | |
| 2019/0330981 A1 | 10/2019 | Lei et al. | |

FOREIGN PATENT DOCUMENTS

CN    107795320 A    3/2018

OTHER PUBLICATIONS

Fateh Bouchaala, et al., "Seismic and sonic wave attenuation of carbonate rocks in an onshore Abu Dhabi oil field", SEG International Exposition and 86th Annual Meeting, Sep. 2016, pp. 2780-2785.

* cited by examiner

*Primary Examiner* — Kristyn A Hall
(74) *Attorney, Agent, or Firm* — Oblon, McClelland, Maier & Neustadt, L.L.P.

(57) ABSTRACT

A formation evaluating system including a sonic sensor device attached to a drill string adjacent to a bit includes a sonic source and a first sonic receiver aligned adjacent to the sonic source, and a second sonic receiver aligned with a horizontal offset X. Three kind of two-way trip times are measured: from the sonic source to a) the first receiver after a reflection at the borehole wall, b) the first receiver after propagation in a layer below the borehole wall, an invaded zone, and a reflection at an interface below the borehole wall, and c) the second receiver after oblique propagations in the invaded zone and a reflection at the interface. After determining a sonic speed in the drilling mud and a sonic speed in a matrix of the invaded zone, a porosity and a thickness of the invaded zone are estimated based on a time average equation.

20 Claims, 6 Drawing Sheets

MODIFIED SONIC TOOL FOR ADVANCED FORMATION EVALUATION

BACKGROUND

Technical Field

The present disclosure is directed to formation evaluation and petrophysics required for reservoir characterization and reservoir engineering in oil or gas production field.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hydrocarbon reserves of an oil or gas reservoir can be expressed by a product $KAh\varphi (1-S_w)$, where, A is a reservoir area size, h is an averaged reservoir thickness ("thickness"), $\varphi$ is an averaged reservoir decimal porosity ("porosity"), $S_w$ is an averaged reservoir decimal water saturation ("water saturation"), and K is a constant. Noticeably, since A can take a huge size, small changes in h, $\varphi$ and $S_w$ can result in a very large change in the value of the hydrocarbon reserves. Thus, practically the terms are replaced by $\Sigma_{i=1}^{n} h_i \varphi_i (1-S_{wi})$, where $h_i$ can be as small as the sampling interval on well logs, such as those in detailed records of drilling of boreholes. Well logs include mud logs, wireline logs and MWD/LWD logs. The mud logs are a record created by examining cutting samples of rock brought to the surface by drilling. Wireline logs, or open-hole wireline logs, are acquired electrically by suspending an instrument package on a cable into a well after the well has been drilled. MWD/LWD, or Measurement While Drilling/Logging While Drilling are real time logging and drilling methods which permit logging in high angle deviated or horizontal wells and real time analysis. Reported measurement tools or measured items include Acoustic interval transit time, Neutron porosity (PHIN), Bulk density (RHOB), Natural gamma radiation, Photoelectric factor (PEF), Spontaneous polarization (SP), Apparent resistivity (R), and Nuclear magnetic resonance (NMR) relaxation time. See for example, Fred Aminzadeh, Shivaji N. Dasgupta, "Geophysics for Petroleum Engineers," *Developments in Petroleum Science*, 2013; incorporated herein by reference in its entirety.

A major challenge facing the oil and gas industry is identifying and/or quantifying the presence of hydrocarbons in thinly laminated beds, known as "Low Resistivity Beds (LRB)." Usually the presence of hydrocarbons is below the vertical resolution of the standard logs. LRB have been a challenge to deal with in the oil and gas industry, especially in carbonate reservoirs but more commonly in clastic reservoirs. Although LRB contain hydrocarbons, these geologic strata can be easily bypassed in conventional resistivity measurement.

An empirical rule known as Archie's law teaches that oil- and/or gas-filled rocks generally exhibit larger resistivities than those of water filled rocks, and a large value in water saturation causes a low resistivity of rocks. Thus, low resistivity readings generally result in an estimation of a high-water saturation. Consequently, the corresponding hydrocarbon reserves are underestimated creating a discrepancy in comparison the total volume of hydrocarbon originally present in a reservoir, namely, Original Oil or Gas in Place (OOIP and OGIP). See, Saha, S., 2003. "Low-Resistivity Pay (LRP): Ideas for Solution", SPE paper 85675, *SPE 27th Annual Technical Conference and Exhibition*, Abuja, Nigeria, Aug. 4-6 2003, and Glover P. W. J., "Archie's law—a reappraisal," *Solid Earth*, 7, 1157-1169, 2016, entire contents of which are incorporated herein by reference.

Many causes of LRB phenomena have been reported in the literatures. One of the causes can occur when a well is drilled with a conductive or highly saline mud which invades the formation. The largest influence to resistivity logs happens when the invasion is deep in the formation. Another cause is the presence of clay, especially in clastic formations. See, Boyd A., et. al., "The Lowdown of Low-Resistivity Pay," *Schlumberger Oilfield Review*, Autumn issue. 1995. Clays result in over conductivity because of the clay's cation exchange capacity. Archie's equation does not hold true in this case and several shaly sand equations were developed in an attempt to account for the clay effect and to compute accurate water saturation. See for example, Worthington P. F., "The Evolution Of Shaly-sand Concepts in Reservoir Evaluation," *The Log Analyst*, V. 26, 01 1985, and Herron, M. M., et al. "Real time petrophysical analysis in siliciclastics from the integration of spectroscopy and triple combo logging," *Paper SPE 77630 presented at the APE ATCE*, San Antonio, Tex., 29 Sep.-2 Oct. 2002.

FIG. 1 illustrates a core description for a highly laminated sand/shale sequence gas reservoir. The lamination density (structure) is beyond the limits of the logging tool's vertical resolution. As indicated in the example, there is a need for a tool that can describe the lamination with high accuracy and low cost. The use of an acoustic tool in combination of traditional devices can help identify and characterize these LRB in addition to corresponding porosity profiles. See for example, Herron 2002, SPE 77631 includes detailed explanation in FIGS. 1-4.

SUMMARY

In an exemplary embodiment, a formation evaluation system includes a sonic source and two sonic receivers aligned close to a borehole wall with a horizontal offset X, and a circuitry. The system is configured to measure three kind of two-way trip times: from the sonic source a) to the first receiver after a reflection at the borehole wall, b) to the first receiver after propagation in a layer below the borehole wall, an invaded zone, and a reflection at an interface below the borehole wall, and c) to the second receiver after oblique propagations in the invaded zone and a reflection at the interface. The system is further configured to determine a sonic speed in the drilling mud, and then to estimate a thickness of the invaded zone. The system is further configured to determine a sonic speed in a matrix of the invaded zone and to estimate a porosity of the invaded zone from a time average equation.

In another exemplary embodiment, the formation evaluation system is further configured to repeat measuring of the thicknesses of the invaded zone, and to measure a thickness of a layer defined by two interfaces in the formation.

In another exemplary embodiment, a sonic sensor device includes a sonic source attached to a drill string adjacent to a bit, a first sonic receiver aligned adjacent to and at a location substantially same as the sonic source in a horizontal direction, a second sonic receiver aligned at a level substantially same as the first sonic receiver and with an offset X(m) from the sonic source in the horizontal direction and a circuitry. The circuitry is configured to drive the sonic source with an electric signal to generate the sonic signal, monitor a receiver signal for each of the first sonic receiver and the second sonic receivers, and measure the three kind of two-way trip times. The sonic sensor device is further configured to determine a sonic speed in the drilling mud, and then to estimate a thickness of the invaded zone. The sonic sensor device is further configured to determine a sonic speed in a matrix of the invaded zone and to estimate a porosity of the invaded zone from a time average equation. The sonic sensor device is further configured to repeat measuring of the thicknesses of the invaded zone, and to measure a thickness of a layer defined by two interfaces in the formation.

In another exemplary embodiment, a method for evaluating a formation includes generating a sonic signal from the sonic source, monitoring a sensor signal for each of the sonic receivers, and measuring the three kind of two-way trip times. The method further includes determining a sonic speed in the drilling mud, and estimating a thickness of the invaded zone. The method further includes determining a sonic speed in a matrix of the invaded zone, and estimating a porosity of the invaded zone based on a time average equation. The method further includes repeating measurement of the thicknesses of the invaded zone, and measuring a thickness of a layer defined by two interfaces in the formation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
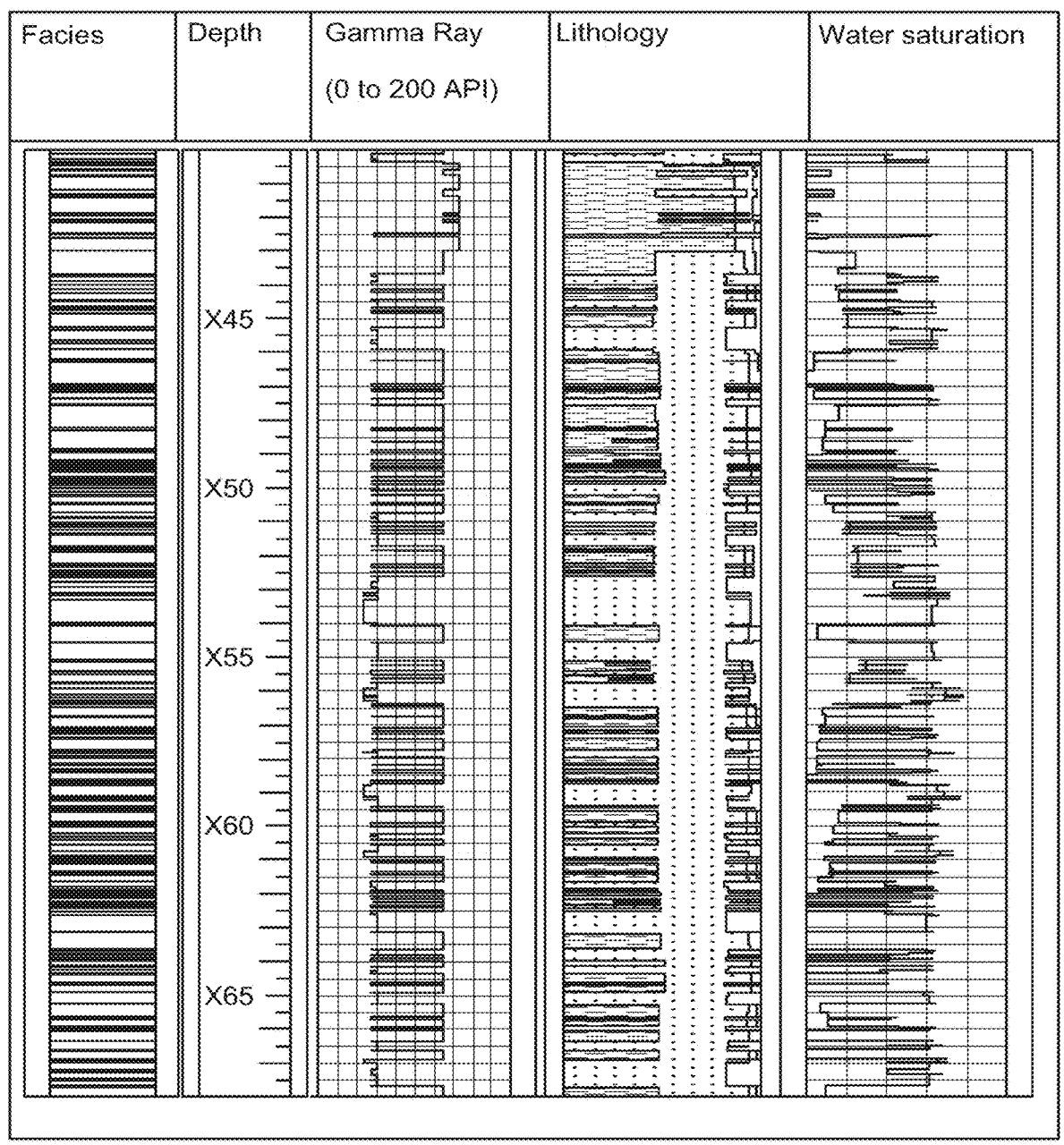
FIG. 1 is an illustration of a core description for a highly laminated sand/shale sequence gas reservoir. Units are in ft., with each grid representing 6 in., yellow (light shading) represents 100% sandstone and the darkest shading represents 100% shale with varying densities of shading representing shaly sand based on the shale content. For lithology the yellow color (light shading) is sand stone and gray is shale.

In the drawings, like reference numerals designate identical or corresponding parts throughout the several views.

Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, a device and a method for formation evaluation to establish a presence of hydrocarbons in thinly laminated beds, namely the low resistivity beds. The system or the device includes a sonic sensor including an ultrasonic pulse source and at least two sonic wave receivers, one attached at proximity to the ultrasonic pulse source and the other attached with an "offset" in horizontal direction.

Figure 2:
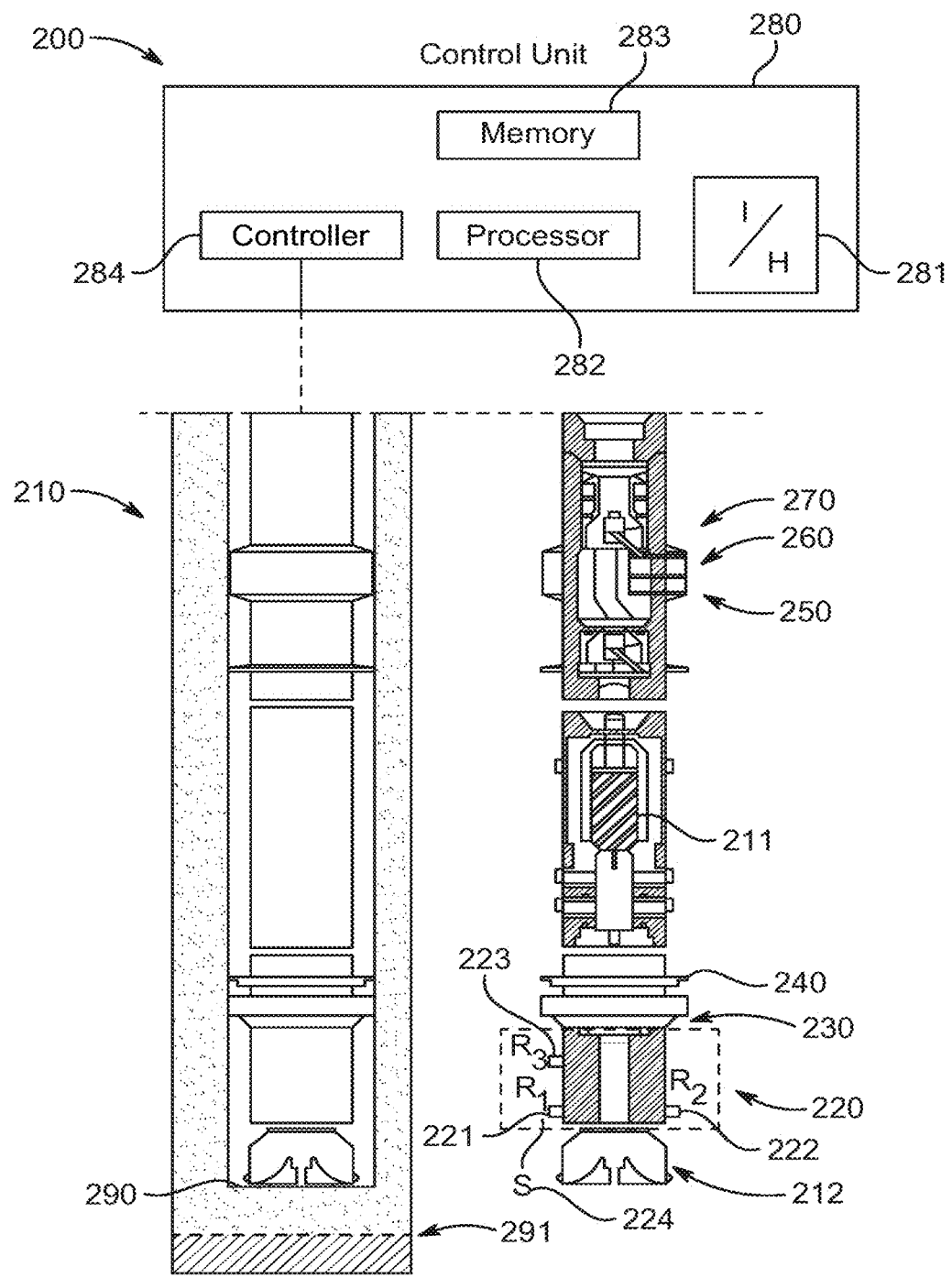
FIG. 2 is a schematic illustration of a formation evaluation system according to certain embodiments of the present disclosure.

FIG. 2 is a schematic illustration of a formation evaluation system 200 according to certain embodiments of the present disclosure. A drill string 210 is constituted for a logging while drilling (LWD), and includes a sonic sensor 220 in addition to other conventional sensors including a gamma ray sensor 230, a resistivity sensor 240, a density sensor 250, a neutron sensor 260, and a spectroscopy sensor 270. The LWD enables measurements and transmission of measurement results in real time to a surface as "real-time data," via for example a drilling mud pulse. Integration of neutron spectroscopy and the "triple combo" of neutron, density and resistivity logs have demonstrated feasibility of real-time petrophysical analysis. See "Real-Time Petrophysical Analysis in Siliciclastics From the Integration of Spectroscopy and Triple-Combo Logging," Michael M. Herron, et al., SPE 77631, SPE Annual Technical Conference and Exhibition, 2002, "APPLICATION OF NUCLEAR SPECTROSCOPY LOGS TO THE DERIVATION OF FORMATION MATRIX DENSITY," Susan L. Herron et al., the 41st Annual Logging Symposium of the Society of Professional Well Log Analysts, Jun. 4-7, 2000, and "Logging while drilling," https://en.wikipedia.org/wiki/Logging_while_drilling, entire contents of which are incorporated herein by reference.

The drill string 210 also includes a turbine or a motor 211 to drive a bit 212 for drilling. The turbine or the motor 211 is driven by a drilling system not illustrated here. The drilling system is configured to control drilling, measure a depth of the bit, that is, a depth of a borehole wall and to convey in real time the depth of the bit to a control unit 280 of the formation evaluation system 200.

The control unit 280 of the formation evaluation system includes a human interface 281, a processor 282, a memory 283, and a controller 284. The controller 284 is configured to drive, monitor all sensors and convey an acquired information from sensors to the processor 282. The processor 282 is configured to receive the acquired information from the controller 284, process according to a preinstalled program and based on a database preinstalled to the memory, and further configured to store results to the memory together with the information received form the controller 284. The processor 282 is also configured to accept an operator instruction or a data input via the human interface 281, and to add corresponding modifications to the programs or to the database preinstalled to the memory or to the controller. The control unit 280 may be partly integrated into the drilling string connected with a surface control unit via a transmission means such as the drilling mud pulse or a wireless transmission.

The sonic sensor 220 according to certain embodiments illustrated here is a configuration for a vertical or near vertical drilling application, and includes a sonic source S224, a first sonic receiver $R_1$ 221, a second sonic receiver $R_2$ 222. The sonic source S224 is attached to a string wall at above the bit, thus configured to situate close to a borehole wall. The first sonic receiver $R_1$ is attached to the string wall and aligned adjacent to the sonic source S 224, the second sonic receiver $R_2$ 222 is attached to the string wall and aligned at a level substantially same as of the sonic source S 224 and with an offset X(m) from the sonic source S 224 in a horizontal direction. The sonic sensor 220 may include a third sonic receiver $R_3$ 223 attached to the string wall and aligned straightly above or straightly below the first sonic receiver $R_1$ 221 with a distance Y (m) from the first sonic receiver $R_1$ 221.

The control unit 280 is configured to drive the sonic source S 224 to generate an ultrasonic pulse and monitor a receiver signal for each of the first sonic receiver $R_1$ 221 and the second sonic receivers $R_2$ 222 to detect ultrasonic pulses reflected by the borehole wall 290 and an interface 291 in the formation.

Figure 3:
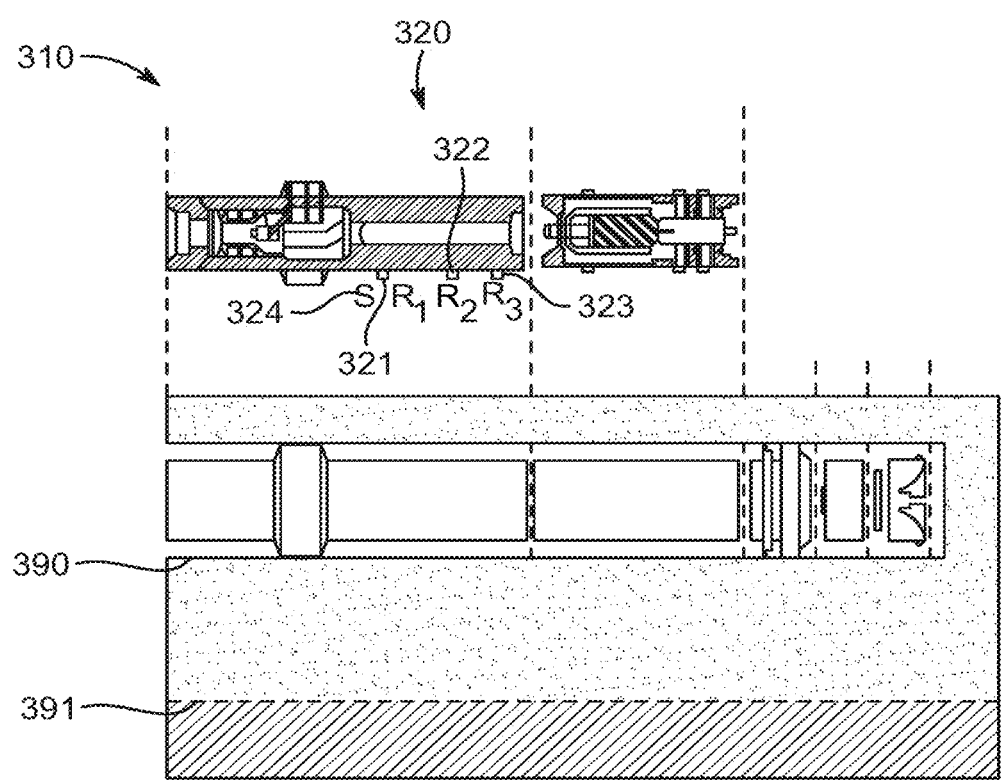
FIG. 3 is a schematic illustration of a drill string for a horizontal drilling application according to certain embodiments of the present disclosure.

FIG. 3 is a schematic illustration of a drill string 310 for a horizontal drilling application according to certain embodiments of the present disclosure. The sonic sensor 320 is preferably configured for horizontal drilling and includes a sonic source S324, a first sonic receiver $R_1$ 321, a second sonic receiver $R_2$ 322, and a third sonic receiver $R_3$ 323. The sonic source S324 is attached to a string wall (e.g., tubing wall) and is configured to generate an ultrasonic pulse that propagates downward, namely toward the formation to be characterized. The first sonic receiver $R_1$ 321 is attached to the string wall and aligned adjacent to the sonic source S 324, the second sonic receiver $R_2$ 322 is attached to the string wall and aligned at a level substantially same as of the sonic source S 324 and the first sonic receiver $R_1$ 321 with an offset X(m) from the sonic source S 324 in a horizontal direction. The sonic sensor S324 may include a third sonic receiver $R_3$ 323 attached to the string wall and aligned in line with the sonic source S324 and the second sonic receiver $R_2$ 322 with a distance Z (m) from the first sonic receiver $R_1$ 321.

Figure 4:
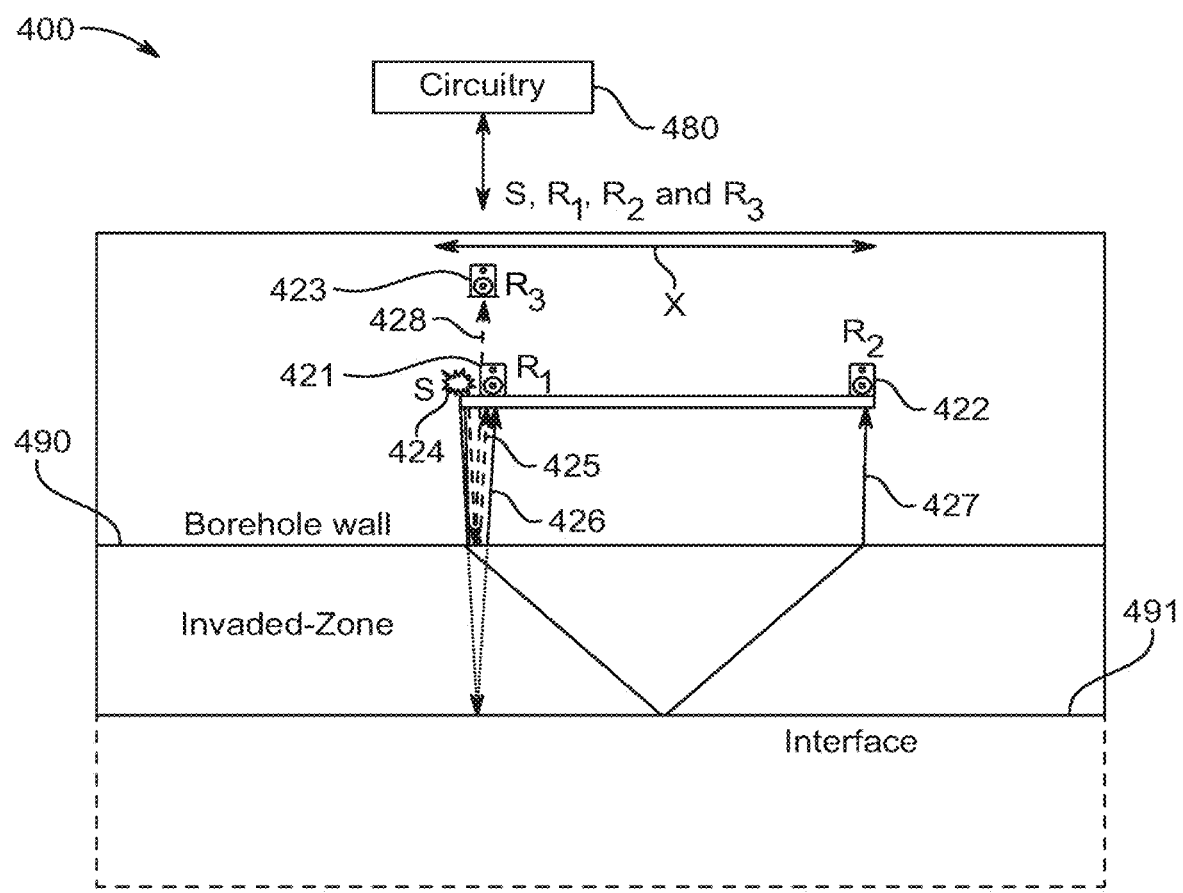
FIG. 4 is a schematic illustration of configuration and operation principle of a sonic sensor device according to certain embodiments of the present disclosure.

FIG. 4 is a schematic illustration of configuration and operation principle of a sonic sensor device 400 according to certain embodiments of the present disclosure. A sonic signal, or an ultrasonic pulse generated by the sonic source S 424, propagates toward the formation and is reflected either at the borehole wall 490 or at the interface 491 and reaches the first sonic receiver $R_1$ 421 or the second sonic receiver $R_2$ 422. Circuitry 480 is configured to drive the sonic source 424 to generate a sonic signal toward the formation, monitor a receiver signal for each of the first sonic receiver $R_1$ 421 and the second sonic receivers $R_2$ 422 and to measure i) a trip time $T_{0b}$ (s) of an ultrasonic pulse 425 from the sonic source S 424 to the first sonic receiver $R_1$ 421 for the ultrasonic pulse 425 arrived after a reflection at the borehole wall 490, ii) a trip time $T_{0i}$ (s) of an ultrasonic pulse 426 from the sonic source S to the first sonic receiver $R_1$ for the ultrasonic pulse 426 arrived after a reflection at an interface 491 of the formation below the borehole wall 490, and iii) a trip time $T_2$ (s) of an ultrasonic pulse 427 from the sonic source S 424 to the second sonic receiver $R_2$ 422 for the ultrasonic pulse 427 arrived after refractions at the borehole wall 490 and a reflection at the interface 491 of the formation below the borehole wall 490.

The circuitry 480 may further be configured to measure iv) a trip time $T_{3b}$ of an ultrasonic pulse from the sonic source S 424 to the third sonic receiver $R_3$ 423 for the ultrasonic pulse 428 arrived after a reflection at the borehole wall 490.

The operating principle of the sonic sensor based on calculations to estimate a porosity and a thickness of a thin layer of the formations according to certain embodiments are described below. In a formation having of a sequence of N-parallel horizontal layers, a root means square velocity $V_{RMS\ N}$ is defined for a two-way travel of a sonic wave perpendicular to the layers with a reflection at the N-th layer as:

$$V_{RMS\ N}^2 = \frac{\sum_{1}^{N} V_i^2 \Delta T_i}{\sum_{1}^{N} \Delta T_i}, \quad (1)$$

where, $V_i$ and $\Delta T_i$ each denotes a sonic speed and a round trip time for a perpendicular propagation of the sound in the i-th layer. See, "Velocity analysis for transversely isotropic media," Tariq Alkhalifah and Ilya Tsvankin, *GEOPHYSICS*, VOL. 60, NO. 5 (Spetember-October 1995); P. 1550-1566, 21, FIGS, entire content of which is incorporated herein by reference. Thus, for a structure having of two layers of drilling mud (fluid) and the invaded zone in FIG. 4, the root means square velocity $V_{RMS}$ for a round trip between the sonic source/the first sonic receiver and the interface 491 can be expressed as:

$$V_{RMS}^2 \equiv \frac{V_W^2 T_{0b} + V_r^2 (T_{0i} - T_{0b})}{T_{0i}} = \frac{V_W^2 T_{0b} + V_r^2 \Delta T_0}{T_{0i}}, \quad (2)$$

$$\Delta T_0 = T_{0i} - T_{0b} \quad (3)$$

where $V_r$ denotes a sonic speed in the invaded zone, and $\Delta T_0$, a two-way trip time across the invaded zone in a direction perpendicular to the interface.

The trip time $T_2$ defined above can be derived as below. Based on reported values on the sonic speeds in the drilling mud and various types of rocks, the sonic speed $V_r$ in the invaded zone, namely in various types of rocks is larger about more than three times the sonic speed in the drilling mud in most cases; $V_w << V_r$. See, Table 3C.3 "Velocity and acoustic slowness (transit time) values for common reservoir fluids and lithologies (after Carmichael)," https_://petrowiki.org/File:Vol5_Page_0174_Image_0001.png, and also Carmichael, R. S. ed. 1982. Handbook of Physical Properties of Rocks, Vol. 2, 1-228, Boca Raton, Fla.: CRC Press Inc., the entire contents of both are incorporated herein by reference. Thus, the two-way trip of the sonic wave can be approximated by two portions: almost perpendicular paths in the drilling mud with a distance $d_0$, and oblique paths of 2l in the invaded zone of a thickness d with a reflection at the interface 49, as illustrated. Then the two-way trip time $T_2$ between the sonic source S and the second sonic receiver $R_2$ can be estimated as:

$$T_2 \cong T_{0b} + \frac{2l}{V_r} = T_{0b} + \frac{2\sqrt{d^2 + \left(\frac{X}{2}\right)^2}}{V_r} \cong T_{0b} + \frac{2d\left[1 + \frac{1}{2}\left(\frac{X}{2d}\right)^2\right]}{V_r}, \quad (4)$$

where $$\left(\frac{X}{2d}\right)^2 \ll 1 \quad (5)$$

has been assumed. Further $$T_2 \cong T_{0b} + \frac{2d}{V_r} + \frac{X^2}{4dV_r} = T_{0i} + \frac{X^2}{4dV_r} = T_{0i}\left(1 + \frac{X^2}{T_{0i}4dV_r}\right) \quad (6)$$

$$T_2^2 \cong T_{0i}^2 + 2T_{0i}\frac{X^2}{4dV_r} = T_{0i}^2 + 2\frac{V_W^2 T_{0b} + V_r^2 \Delta T_0}{V_{RMS}^2} \frac{X^2}{4dV_r} \quad (7)$$

Noticing a relation, $$V_w^2 T_{0b} = 2d_0 V_w \ll V_r^2 \Delta T_0 = V_r^2(T_{0i} - T_{0b}) \approx 2dV_r, \quad (8)$$

so far as $V_w \ll V_r$ and $d_o \leq d$, the equation (7) is reduced to:

$$T_2^2 \cong T_{0i}^2 + \frac{X^2}{V_{RMS}^2}. \quad (9)$$

Namely, $$V_{RMS}^2 \cong \frac{X^2}{T_2^2 - T_{0i}^2}. \quad (10)$$

Solving the equation (2) for $V_r$ and substituting Equation (10) gives, $$V_r^2 = \frac{V_{RMS}^2 T_{0i} - V_W^2 T_{0b}}{\Delta T_0} = \frac{\left(\frac{X^2}{T_2^2 - T_{0i}^2}\right)T_{0i} - V_W^2 T_{0b}}{\Delta T_0}, \quad (11)$$

$$V_r = \sqrt{\frac{\left(\frac{X^2}{T_2^2 - T_{0i}^2}\right)T_{0i} - V_W^2 T_{0b}}{\Delta T_0}} = \sqrt{\frac{\left(\frac{X^2}{T_2^2 - T_{0i}^2}\right)T_{0i} - V_W^2 T_{0b}}{T_{0i} - T_{0b}}}. \quad (12)$$

On the other hand, the sonic speed $V_r$ of the invaded zone, or of a formation in general, is related to a porosity φ of the formation via a following empirical relation known as the Wyllie time average equation:

$$\frac{1}{V_r} = \frac{\varphi}{V_f} + \frac{1-\varphi}{V_m}, \quad (13)$$

where, $V_f$ and $V_m$ each denotes a sonic speed in an interstitial fluid in the formation and a sonic speed in a rock matrix of the formation, respectively. See, "ELASTIC WAVE VELOCITIES IN HETEROGENEOUS AND POROUS MEDIA," Wyllie M. R. J., Gregory A. R., and Gardner L. W., *Geophysics*, Vol. XXI, NO. 1 January, 1956), PP. 41-70, 19 FIGS, and Winkler K. W. and Murphy W. F. III, "Acoustic Velocity and Attenuation in Porous Rocks," *Rock Physics and Phase Relations, A Handbook of Physical Constants*, American Geophysical Union, 1995, entire contents of which are incorporated herein by reference.

Equation 13 can be solved for the porosity φ as:

$$\varphi = \frac{\frac{1}{V_f} - \frac{1}{V_m}}{\frac{1}{V_f} - \frac{1}{V_m}}. \quad (14)$$

Substituting Equation (12) under conventional approximation of $V_f \cong V_w$, Equation (14) gives, $$\varphi = \frac{\frac{1}{\sqrt{\left(\frac{X^2}{T_2^2 - T_{0i}^2}\right)T_{0i} - V_W^2 T_{0b}}} - \frac{1}{V_m}}{\frac{1}{V_m} - \frac{1}{V_m}}. \quad (15)$$

The acoustic speeds for common reservoir fluids and matrices of rocks have been reported as described earlier. Carmichael R. S., 1b. Most of them are reproduced as Table I and Table II below converting values to MKS unit.

TABLE I

Acoustic Speeds for Common Reservoir Fluids

| Fluid | $V_f$ (m/s) |
|---|---|
| Salt mud | 1650 |
| Water with 20% NaCl | 1615 |
| Water with 15% NaCl | 1524 |
| Water with 10% NaCl | 1463 |
| Water (Pure) | 1402 |
| Oil | 1280 |
| Methane | 488 |
| Air | 335 |

TABLE II

Acoustic Speeds for matrices of rocks

| Lithology (Matrices of rocks) | $V_m$ (m/s) |
|---|---|
| Carbonate rocks | |
| Limestone | 6400 |
| Dolomite | 7000 |
| Sandstone | |
| Consolidated | 5800 |
| Semiconsolidated | 5500 |
| Shale | 1800–4900 |
| Granite | 6100 |
| Coal | 2200–2900 |
| Minerals | |
| Calcite | 6700 |
| Quartz | 5500 |
| Pyrite | 8000 |
| Mica | 6000–6500 |
| Anhydrite | 6100 |
| Gypsum | 5800 |

As observed in Table I, the sonic speeds of most borehole and interstitial fluids do not vary largely, except those for gases. Thus, one of the practical approaches for determining a value for the sonic speed $V_w$ in an interstitial fluid or in a drilling mud has conventionally been to assume a sonic speed of 1620 m/s by adopting the value for the water with 20% NaCl. A slightly higher speed 1650 m/s has been conventionally used for salt muds. Notably, oil has an acoustic speed about 20% smaller than these commonly used values. Therefore, as an alternative approach, an actual sonic speed $V_w$ in the drilling mud can be measured while drilling from a difference between two trip times from the sonic source S to two sonic receivers situated with a different distance from the sonic source S, for example, the first sonic receiver $R_1$ 424 and the third sonic receiver $R_3$ 423.

On the other hand, the sonic speeds in the rock matrices of the formation are largely dispersed depending on matrices as apparent from the Table II. Thus, determining a sonic speed in the matrix of the invaded zone requires identifying the matrices of the invaded zone. Identification from acquired mud logs is one of the feasible options. Another feasible approach includes an identification of the matrices based on quantitative lithology interpretation which has been reported as described earlier. M. M. Herron et al., Ib., S. L. Herron et al., Ib. The neutron-induced gamma-ray spectroscopy which is commercially available is utilized for the interpretation. See for example, https_://www.slb.com/resource-library/industry-article/fe/elemental-spectroscopy-yields-ultimate-answer, entire content of which is incorporated herein by reference. Once the matrix of the invaded zone has been identified, the sonic speed Vin of the matrix of rock in the invaded zone can be determined from a database on sonic speeds for various matrices of rocks, exemplified in Table II.

The porosity φ of the invaded zone can be estimated from Equation (15), once the sonic speeds in an interstitial fluid in the formation and the sonic speed in the rock matrix of the formation $V_m$ have been determined as above, in addition to measurements of the two way trip times $T_{0b}$, $T_{0i}$ and $T_2$. Also, the distance d between the borehole wall 490 and the interface 491 of the formation below the borehole wall 490 can be obtained as:

$$d = \frac{1}{2}V_r(T_{0i} - T_{0b}) = \frac{1}{2}\sqrt{(T_{0i} - T_{0b})\left[\left(\frac{X^2}{T_2^2 - T_{0i}^2}\right)T_{0i} - V_w^2 T_{0b}\right]}. \quad (16)$$

Figure 5A:
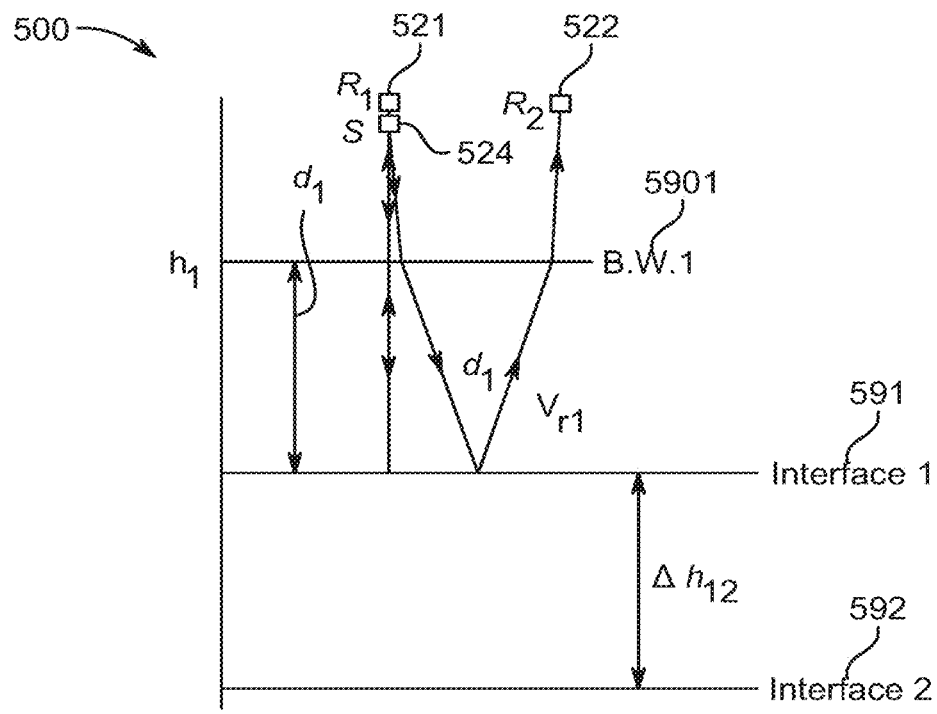
FIG. 5 is a schematic illustration of configurations of a sonic sensor device, borehole wall positions and a formation with an interfaces and an interface 2 for measuring a thickness $\Delta h_{12}$ of a layer defined by the interface 1 and the interface 2, according to certain embodiments of the present disclosure.
Figure 5B:
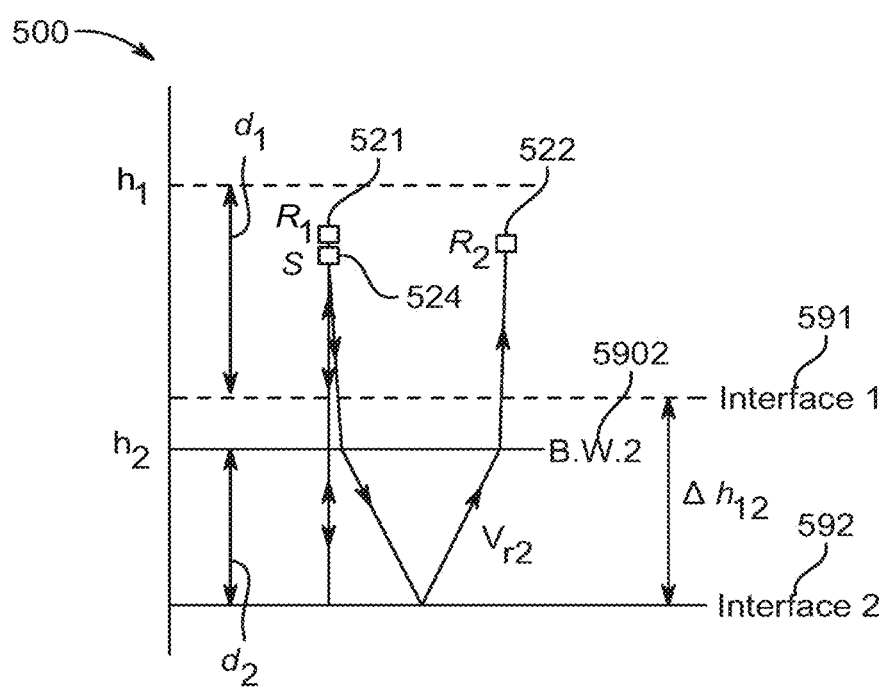

FIG. 5 illustrates configurations 500 of sonic sensors, borehole wall positions and a formation with interface layers 1 and 2 for measuring a thickness $\Delta h_{12}$ of a layer defined by the interface 1 and interface 2, according to certain embodiments of the present disclosure. In a configuration of FIG. 5 (A), first step measurements described above in FIG. 4 are performed when the borehole wall B.W. 1 5901 is at a depth $h_1$ and above the interface 1 with a distance $d_1$. Here, the distance $d_1$ is given from Equation (16) as:

$$d_1 = \frac{1}{2}\sqrt{(T_{0i1} - T_{0b1})\left[\left(\frac{X^2}{T_{21}^2 - T_{0i1}^2}\right)T_{0i1} - V_w^2 T_{0b1}\right]}, \quad (17)$$

where, the last subscript 1 for each of measured trip times denotes the measurements were made when the borehole wall was at the depth $h_1$. Then after a certain amount of further drilling, in a configuration of FIG. 5 (B), when the borehole wall B.W.2 (5902) is at a depth $h_2$ and between the interface 1 591 and the interface 2 592 with a distance $d_2$ from the interface 2 (592), a second step measurements are performed. Here, the distance $d_2$ is given from Equation (16) as:

$$d_2 = \frac{1}{2}\sqrt{(T_{0i2} - T_{0b2})\left[\left(\frac{X^2}{T_{22}^2 - T_{0i2}^2}\right)T_{0i2} - V_w^2 T_{0b2}\right]}, \quad (18)$$

where, the last subscript 2 for each measured trip times denotes the measurement was made when the borehole wall was at the depth $h_2$. Then, the thickness $\Delta h_{12}$ of the layer defined by the interface 1 (591) and interface 2 (592) is given as:

$$\Delta h_{12} = h_2 - h_1 - d_1 + d_2. \quad (19)$$

Now, a resolution of the measurement of the thickness $\Delta h_{12}$, in other words, a minimum thickness measurable according to Equation (19) is discussed below. Factors limiting the accuracy of measurements using Equation (19) include: (i) an error in measuring the depth difference $(h_2 - h_1)$, and (ii) accuracy of measuring the distance $d_1$ and $d_2$ from Equation (16). The depth difference $(h_2 - h_1)$ can be measured directly from positions of the drill string in LWD, thus an error of less than a few cm can be reasonably expected. On the other hand, accuracy of Equation (16) is limited by factors: (a) accuracy of measurements of the two-way trip times; and (b) conditions assumed in deriving Equation (16). The former, factor (a), is limited by a response speed of the sonic receivers. Utilizing a commercially available ultrasonic receiver with a bandwidth of 300 kHz, a transient response time τ of 0.5 μs, a time resolution of 1 μs can be realized. Then, the accuracy of the distance d about 0.02 m can be expected with a maximum $V_r$ of 20,000 m/s in Equation (16). The latter, conditions b) includes two requirements: Equations (5) and (8). Equation (5) can be simplified further with a condition that the approximation of neglecting the term of $$\left(\frac{X}{2d}\right)^4$$

causes an error less than about 3%.

$$\left(\frac{X}{2d}\right)^4 \leq \sqrt{8 \times 0.03} = 0.49 \quad (20)$$

$$\frac{X}{2d} \leq \sqrt{0.49} = 0.7,$$

$$d \geq 0.7X. \quad (21)$$

In Equation (21), a requirement on the offset X further arises from a requirement that the difference between the two-way trip times $(T_2 - T_{0i})$ needs to be larger than the time resolution $\Delta T$. Note here $\Delta T \neq \Delta T_0$. Applying this requirement to Equation (10) leads to $$X \cong V_{RMS}\sqrt{(T_2 + T_{0i})(T_2 - T_{0i})} \geq V_{RMS}\sqrt{(T_2 + T_{0i})(\Delta T)} \cong \quad (22)$$

$$V_{RMS}\sqrt{(2T_{0i})(\Delta T)} \cong \sqrt{V_{RMS}^2\left(2\frac{d_0 + d}{V_{RMS}}\right)(\Delta T)} = \sqrt{2V_{RMS}(d_0 + d)(\Delta T)}.$$

Assuming $V_{RMS} = 4000$ m/s, and $\Delta T = 1$ μs, $$X \geq \sqrt{8 \times 10^{-3}(d_0 + d)}. \quad (23)$$

Equation (23) requires when $(d_0+d)=1$ (m), $X\geq 0.089$ (m) and when $(d_0+d)=0.25$ (m), $X\geq 0.045$ (m). When X takes a minimum value for each of above cases, Equation (21) limits ranges of the distance d and gives a minimum value as $d\geq 6.3\times 10^{-2}$ (m), for $X=0.089$ m, and $d\geq 3.2\times 10^{-2}$ (m), for $X=0.045$ m, respectively. Equation (23) limits the sum of the distances $(d_0+d)$ to be $$(d_0+d)\leq 125X^2. \quad (24)$$

Equation (24) reduces to $(d_0+d)\leq 1$ (m) for $X=0.089$ m, and $(d_0+d)\leq 0.25$ (m) for $X=0.045$ m, respectively.
On the other hand, Equation (8) reduces to $$d \gg \frac{V_w}{V_r}d_0 \approx \frac{1}{3}d_0,$$

which can be approximated by, $$d\geq d_0. \quad (25)$$

Combining the requirement of equation (25) with equation (24), requirements on d (m) can be summarized as Table III for the two offset X cases. In Table III, a practical range of the thickness $d_0$, $0.05\leq d_0(m)\leq 0.2$ has been assumed, since the thickness $d_0$ represents a distance from the sonic source S 524 to the borehole wall, that is, to an bit edge assuming a vertical drilling in the configuration in FIG. 2. Conversely stated, for each of the $d_0$ value in Table III, a bit height less than $d_0$ is assumed and required in the vertical drilling configuration.

Table III. Possible values of the thickness d for two cases of the offset X: (A) for $X=0.089$ m, (B) for $X=0.045$ m.

| $d_0$ | 0.05 | 0.1 | 0.125 | 0.2 |
|---|---|---|---|---|
| $d_{min}$ | 0.063 | 0.1 | 0.125 | 0.2 |
| $d_{max}$ | 0.95 | 0.9 | 0.875 | 0.8 |

A) Offset $X=0.089$ m, $(d_0+d)\leq 1$, $d\geq 0.063$, and $d\geq d_0$

| $d_0$ | 0.05 | 0.1 | 0.125 | 0.2 |
|---|---|---|---|---|
| $d_{min}$ | 0.05 | 0.1 | 0.125 | NA |
| $d_{max}$ | 0.2 | 0.15 | NA | NA |

B) Offset $X=0.045$ m, $(d_0+d)\leq 0.25$, $d\geq 0.032$, and $d\geq d_0$

As observed in Table III, when the offset X is 0.089 m, the minimum of the thickness d is mostly determined by $d_0$ value, where however, smallest value 0.063 m is slightly larger than the $d_0$ (0.05 m). While, when the offset X is 0.045 m, the minimum of the thickness d of the invaded zone is equal to the $d_0$ value, and can be as small as 0.05 m, and determined by $d_0$ value, so far as $d_0$ is less than 0.125 m. Both cases of above (A) and (B) indicate that a smaller $d_0$ is important to realize a small minimum value in d.

When the borehole wall position B.W.2 (5902) is just below the interface 1 (591) in FIG. 5 (B), a minimum value d of above Table III gives the minimum distance $d_2$ from the B.W.2 (5902) to the interface 2 (592), where the minimum distance $d_2$ gives a minimum of the layer thickness $\Delta h_{12}$ that is measurable, namely the resolution in thickness measurement using Equation (19). Therefore, above values of 0.05 to 0.06 m can be deemed the resolution of the thickness measurement under assumed conditions on values of the offset X and the distances $d_0$, in the vertical drilling LWD system according to the certain embodiments of the present disclosure. As above discussed, by choosing conditions, a thickness of a layer as thin as 0.05 m can be measured by the sonic sensor according to certain embodiments of the present disclosure.

Figure 6:
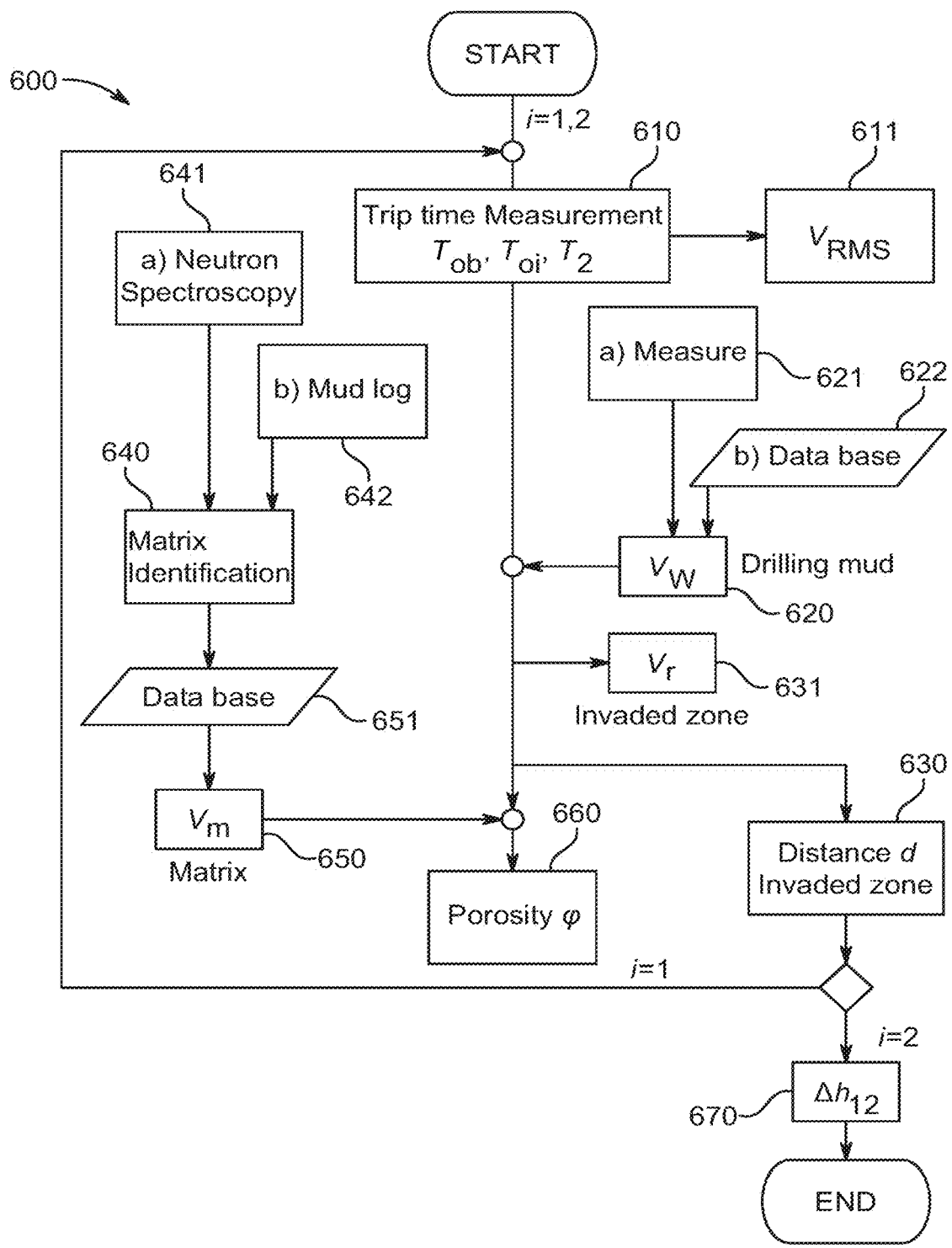
FIG. 6 is illustration of a flow chart for measurement steps according to certain embodiments of the present disclosure.

FIG. 6 illustrates a flow chart 600 for measurement steps according to certain embodiments of the present disclosure. In the configuration of the drilling string and sensors illustrated in FIGS. 1 to 5 and described above, in a step 610, when the borehole wall is at a depth h, the two-way trip times $T_{ob}$, $T_{oi}$, and $T_2$ are measured and stored with the depth h. Then at optional step 611, a room mean square sonic speed $V_{RMS}$ can be readily estimated with those three two-way trip times and with the offset X.

At a step 620, a sonic speed in the drilling mud $V_w$ is determined either via a) direct measurement 621 with the sonic sensors or b) by referring a database 622 on the sonic speed of drilling fluids based on a separately identified information of the drilling muds. The sonic speed $V_w$ determined is stored as a value at the depth h.

Now at a step 630, a distance d from the borehole wall to the interface of the formation below the borehole wall is estimated with Equation (16). The distance d obtained is stored with the value of the depth h. In a step 631, a sonic speed in the invaded zone $V_r$ can be estimated from Equation (12) with the same data set as used in Equation (16).

On the other hand, at a step 640 which can be processed independently from the steps above described, a matrix of rock of the invaded zone is identified, based on either a) a lithology determined independently by the neutron spectroscopy 641, for example, or by b) analysis of the mud logs 642 performed beforehand of the LWD. Then, based on the matrix of rock identified, by referring a database 651 on sonic speeds for matrices of rocks, such as Table II, for example, a sonic speed $V_m$ of the matrix of rock in the invaded zone is determined at a step 650. Then, at step 660, a porosity of the invaded zone is estimated with Equation (15) based on all collected information.

Above steps are repeated for the borehole wall position at $h_1$ and $h_2$ illustrated in FIG. 5 and then the thickness $\Delta h_{12}$ of the thin layer between the interface 1 and the interface 2 is estimated with Equation (19).

A number of implementations have been described. Nevertheless, it will be understood that various modifications may be made without departing from the spirit and scope of this disclosure. The above-described hardware description is a non-limiting example of corresponding structure for performing the functionality described herein. In other alternate embodiments, processing features according to the present disclosure may be implemented and commercialized as hardware, a software solution, or a combination thereof.

For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described.

As would be understood by one of ordinary skill in the art, based on the teachings herein, the functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The invention claimed is:

1. A formation evaluation system, comprising:
a sonic source attached to a drill string at a location proximal to a bit, and configured to emit a sonic signal toward a formation to be characterized;
a first sonic receiver aligned adjacent to and at a location substantially same as the sonic source in a horizontal direction;
a second sonic receiver aligned at a level substantially same as the first sonic receiver and with an offset ($X(m)$) from the sonic source; and
a circuitry configured to
drive the sonic source with an electric signal to generate the sonic signal,
monitor a receiver signal for each of the first sonic receiver and the second sonic receivers, and
measure:
a trip time ($T_{0b}(s)$) of a sonic signal from the sonic source to the first sonic receiver for the sonic signal arrived after a reflection at a borehole wall,
a trip time ($T_{0i}(s)$) of a sonic signal from the sonic source to the first sonic receiver for the sonic signal arrived after a reflection at a first interface of the formation below the borehole wall, and
a trip time ($T_2(s)$) of a sonic signal from the sonic source to the second sonic receiver for the sonic signal arrived after refractions at the borehole wall and a reflection at the first interface of the formation below the borehole wall.

2. The formation evaluation system of claim 1, wherein the circuitry is further configured to
determine a sonic speed ($V_w(m/s)$) in a drilling mud by either one of
a) adopting a value from a database preinstalled in the circuitry, or
b) measuring a propagation time between the sonic source and the sonic receiver, and
estimate a distance ($d(m)$) between the borehole wall and the first interface of the formation below the borehole wall, with an equation:

$$d = \frac{1}{2}\sqrt{(T_{0i} - T_{0b})\left[\left(\frac{X^2}{T_2^2 - T_{0i}^2}\right)T_{0i} - V_w^2 T_{0b}\right]}.$$

3. The formation evaluation system of claim 2, wherein the sonic source, the first sonic receiver and the second sonic receiver are aligned at a distance within 0.1 m from a bit edge.

4. The formation evaluation system of claim 3, wherein the circuitry is further configured to
estimate a distance ($d_1(m)$) between a borehole wall and the first interface below the borehole wall when the borehole wall is at a depth ($h_1(m)$),
estimate a distance ($d_2(m)$) from the borehole wall and a second interface below the borehole wall when the borehole wall is at a depth ($h_2(m)$) and is between the first interface and the second interface, and
estimate a thickness ($h_{12}(m)$) of a layer defined by the first interface and the second interface with an equation:

$$\Delta h_{12} = h_2 - h_1 - d_1 + d_2,$$

wherein a minimum value of $\Delta h_{12}$ measurable is not greater than 0.1 m.

5. The formation evaluation system of claim 1, wherein the circuitry is further configured to
determine a sonic wave speed ($V_w(m/s)$) in a drilling mud by either one of
a) adopting a value from a database preinstalled in the circuitry, or
b) measuring a propagation time between the sonic source and a sonic receiver, and
determine a sonic wave speed ($V_m(m/s)$) in a matrix of a layer between the borehole wall and the first interface of the formation below the borehole wall, "an invaded zone," from a database preinstalled in the circuitry, based on an identification of the matrix of the invaded zone made by either one of
i) a neutron spectroscopy separately performed, or
ii) a mud logs analysis performed beforehand, and
estimate a porosity ($\varphi$) of the invaded zone, with an equation:

$$\varphi = \frac{\frac{1}{\sqrt{\frac{\left(\frac{X^2}{T_2^2 - T_{0i}^2}\right)T_{0i} - V_w^2 T_{0b}}{T_{0i} - T_{0b}}}} - \frac{1}{V_m}}{\frac{1}{V_w} - \frac{1}{V_m}}.$$

6. The formation evaluation system of claim 1, wherein the circuitry is further configured to
estimate a root means square sonic wave speed ($V_{RMS}(m/s)$) from the sonic source to the first interface of the formation below the borehole wall with an equation:

$$V_{RMS} = \sqrt{\frac{X^2}{T_2^2 - T_{0i}^2}},$$

determine a sonic wave speed ($V_w(m/s)$) in a drilling mud by either one of
a) adopting a value from a database preinstalled in the circuitry, or
b) measuring a propagation time between the sonic source and a sonic receiver, and
estimate a sonic wave speed ($V_r(m/s)$) in a layer between the borehole wall and the first interface of the formation below the borehole wall, "an invaded zone," with an equation:

$$V_r = \sqrt{\frac{\left(\frac{X^2}{T_2^2 - T_{0i}^2}\right)T_{0i} - V_w^2 T_{0b}}{T_{0i} - T_{0b}}}.$$

7. A sonic sensor device comprising:
a sonic source attached to a drill string adjacent to a bit, and configured to emit a sonic signal toward a formation to be characterized;
a first sonic receiver aligned adjacent to and at a location substantially same as the sonic source in a horizontal direction;
a second sonic receiver aligned at a level substantially same as the first sonic receiver and with an offset ($X(m)$) from the sonic source; and
a circuitry configured to
drive the sonic source with an electric signal to generate the sonic signal,
monitor a receiver signal for each of the first sonic receiver and the second sonic receivers, and
measure
a trip time ($T_{0b}(s)$) of a sonic signal from the sonic source to the first sonic receiver for the sonic signal arrived after a reflection at the borehole wall,
a trip time ($T_{0i}(s)$) of a sonic signal from the sonic source to the first sonic receiver for the sonic signal arrived after a reflection at a first interface of the formation below the borehole wall, and
a trip time ($T_2(s)$) of a sonic signal from the sonic source to the second sonic receiver for the sonic signal arrived after refractions at the borehole wall and a reflection at the first interface of the formation below the borehole wall.

8. The sonic sensor device of claim 7, wherein the circuitry is further configured to
determine a sonic wave speed ($V_w(m/s)$) in a drilling mud by either one of
a) adopting a value from a database preinstalled in the circuitry, or
b) measuring a propagation time between the sonic source and the sonic receiver, and
estimate a distance ($d(m)$) between the borehole wall and the first interface of the formation below the borehole wall, with an equation:

$$d = \frac{1}{2}\sqrt{(T_{0i} - T_{0b})\left[\left(\frac{X^2}{T_2^2 - T_{0i}^2}\right)T_{0i} - V_w^2 T_{0b}\right]},$$

wherein, a distance from the sonic source to an edge of the bit is not greater than 0.1 m.

9. The sonic sensor device of claim 8, wherein the circuitry is further configured to
estimate a distance ($d_1(m)$) between a borehole wall and the first interface below the borehole wall when the borehole wall is at a depth ($h_1(m)$),
estimate a distance ($d_2(m)$) between a borehole wall and a second interface below the borehole wall when the borehole wall is at a depth ($h_2(m)$) and is between the first interface and the second interface, and
estimate a thickness ($\Delta h_{12}(m)$) of a layer defined by the first interface and the second interface with an equation:

$$\Delta h_{12} = h_2 - h_1 - d_1 + d_2, \quad (4)$$

wherein a minimum value of ($\Delta h_{12}$) measurable is not greater than 0.1 m.

10. The sonic sensor device of claim 7, wherein the circuitry is further configured to
determine a sonic wave speed $V_w(m/s)$ in a drilling mud by either one of
a) adopting a value from a database preinstalled in the circuitry, or
b) measuring a propagation time between the sonic source and a sonic receiver, and
determine a sonic wave speed ($V_m(m/s)$) in a matrix of a layer between the borehole wall and the first interface of the formation below the borehole wall, "an invaded zone," from a database preinstalled in the circuitry, based on an identification of the matrix of the invaded zone made by either one of
iii) a neutron spectroscopy separately performed, or
iv) a mud logs analysis performed beforehand, and
estimate a porosity ($\varphi$) of the invaded zone, with an equation:

$$\varphi = \frac{\frac{1}{\sqrt{\frac{\left(\frac{X^2}{T_2^2 - T_{0i}^2}\right)T_{0i} - V_w^2 T_{0b}}{T_{0i} - T_{0b}}}} - \frac{1}{V_m}}{\frac{1}{V_w} - \frac{1}{V_m}}.$$

11. A method for evaluating a formation with a formation evaluation system, the formation evaluation system comprising:
a sonic source attached to a drill string at a location adjacent to a bit, and configured to emit a sonic signal toward a formation to be characterized;
a first sonic receiver aligned adjacent to and at a location substantially same as the sonic source in a horizontal direction;
a second sonic receiver aligned at a level substantially same as the first sonic receiver and with an offset ($X(m)$) from the sonic source; and
a circuitry configured to drive the sonic source with an electric signal to generate the sonic pulse and monitor a receiver signal for each of the first sonic receiver and the second sonic receivers, and
the method comprising:
generating a sonic signal from the sonic source,
monitoring a receiver signal for each of the first sonic receiver and the second sonic receivers, and
measuring
a trip time ($T_{0b}(s)$) of a sonic signal from the sonic source to the first sonic receiver for the sonic signal arrived after a reflection at the borehole wall,
a trip time ($T_{0i}(s)$) of a sonic signal from the sonic source to the first sonic receiver for the sonic signal arrived after a reflection at a first interface of the formation below the borehole wall, and
a trip time ($T_2(s)$) of a sonic signal from the sonic source to the second sonic receiver for the sonic signal arrived after refractions at the borehole wall and a reflection at the first interface of the formation below the borehole wall.

12. The method of claim 11, further comprising:
determining a sonic speed ($V_w(m/s)$) in a drilling mud by either one of
a) adopting a value from a database preinstalled in the circuitry, or
b) measuring a propagation time between the sonic source and the sonic receiver, and estimating a distance (d(m)) between the borehole wall and the first interface of the formation below the borehole wall, with an equation:

$$d = \frac{1}{2}\sqrt{(T_{0i} - T_{0b})\left[\left(\frac{X^2}{T_2^2 - T_{0i}^2}\right)T_{0i} - V_w^2 T_{0b}\right]}. \quad (1)$$

13. The method of claim 12, further comprising:

estimating a distance ($d_1$(m)) between a borehole wall and the first interface below the borehole wall when the borehole wall is at a depth ($h_1$(m)), estimating a distance ($d_2$(m)) between the borehole wall and a second interface below the borehole wall when the borehole wall is at a depth ($h_2$(m)), and between the first interface and the second interface, and estimating a thickness ($\Delta h_{12}$(m)) of a layer defined by the first interface and the second interface with an equation:

$$\Delta h_{12} = h_2 - h_1 - d_1 + d_2, \quad (5)$$

wherein a distance between the sonic source and an edge of the bit is not larger than 0.1 m, and a minimum value of ($\Delta h_{12}$) measurable is not larger than 0.1 m.

14. The method of claim 11, further comprising determining a sonic speed ($V_w$(m/s)) in a drilling mud by either one of a) adopting a value from a database preinstalled in the circuitry, or b) measuring a propagation time between the sonic source and a sonic receiver, and determining a sonic speed ($V_m$ (m/s)) in a matrix of a layer between the borehole wall and the first interface of the formation below the borehole wall, "an invaded zone," from a database preinstalled in the circuitry, based on an identification of the matrix of the invaded zone by either one of v) a neutron spectroscopy separately performed, or vi) a mud logs analysis performed beforehand, and estimating a porosity ($\varphi$) of the invaded zone, with an equation:

$$\varphi = \frac{\dfrac{1}{\sqrt{\dfrac{\left(\dfrac{X^2}{T_2^2 - T_{0i}^2}\right)T_{0i} - V_w^2 T_{0b}}{T_{0i} - T_{0b}}}} - \dfrac{1}{V_m}}{\dfrac{1}{V_w} - \dfrac{1}{V_m}}.$$

15. The method of claim 14, wherein the sonic speed ($V_m$) of the matrix of the invaded zone is determined corresponding to the identification of the matrix of the invaded zone as:
6400 m/s for Limestone,
6700 m/s for Calcite,
7000 m/s for Dolomite,
5800 m/s for Consolidated Sandstone,
5500 m/s for Semiconsolidated Sandstone.

16. The method of claim 15, wherein a distance between the sonic source and an edge of the bit is not larger than 0.1 m, and a minimum value of the thickness of the invaded zone on which the porosity is measurable is not larger than 0.1 m.

17. The method of claim 15, wherein the formation comprises sandstone/shale sequences, the sonic speed ($V_m$) of the matrix is determined corresponding to the identification of the matrix of the invaded zone as:
5800 m/s for Consolidated sandstone,
5500 m/s for Semiconsolidated sandstone,
a value between 1800 m/s and 4900 m/s for shale.

18. The method of claim 14, wherein the formation comprises a carbonate, the sonic speed ($V_m$) of the matrix of the invaded zone is determined corresponding to the identification of the matrix of the invaded zone as:
6400 m/s for Limestone,
6700 m/s for Calcite,
7000 m/s for Dolomite.

19. The method of claim 18, wherein a distance between the sonic source and an edge of the bit is not larger than 0.1 m, and a minimum value of the thickness of the invaded zone on which the porosity is measurable is not larger than 0.1 m.

20. The method of claim 18, wherein the invaded zone comprises sandstone/shale sequences, the sonic speed ($V_m$) of the matrix is determined corresponding to the identification of the matrix of the invaded zone as:
5800 m/s for Consolidated sandstone,
5500 m/s for Semiconsolidated sandstone,
a value between 1800 m/s to 4900 m/s for shale.

\* \* \* \* \*